Feb. 4, 1947.  H. B. BROWN  2,415,274
THERMOMETER
Filed June 28, 1944

INVENTOR.
H. B. BROWN
BY
D. Clyde Jones
ATTORNEY.

Patented Feb. 4, 1947

2,415,274

UNITED STATES PATENT OFFICE 2,415,274

THERMOMETER

H. Brainard Brown, Rochester, N. Y., assignor to Taylor Instrument Companies, Rochester, N. Y., a corporation of New York Application June 28, 1944, Serial No. 542,474

2 Claims. (Cl. 73—376)

This invention relates to a thermometer.

In the past, it has been the practice to fasten the glass stem of a thermometer to a thermometer back by means of pieces of wire or metal band which encompass the thermometer stem. These pieces, after being inserted through holes in the scale plate, are bent to engage the back of this plate. Such fastening means have exposed ends which catch on cleaning cloths or the like. Also, where such bands are used, it requires a skilled operator to produce an acceptable product.

The main feature of the present invention relates to thermometers wherein thermoplastic clasps are fromed to embrace the thermometer stem and to engage the rear surface of the thermometer plate.

Another feature of the invention relates to a thermometer utilizing a clasp which has no part crossing the path of the indicating column of the thermosensitive liquid and yet securely retains the thermometer on its graduated scale plate.

Figure 1:
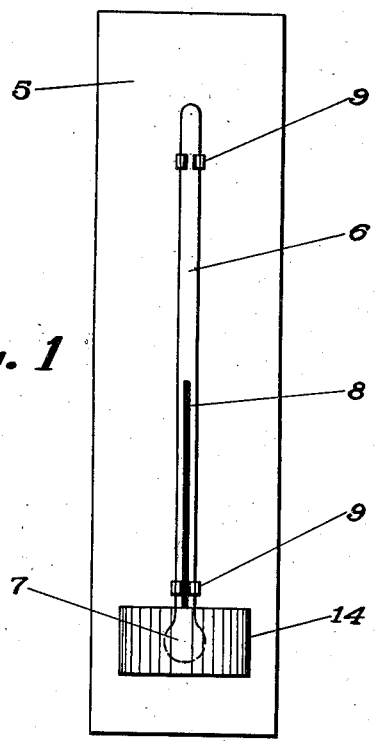
Figure 2:
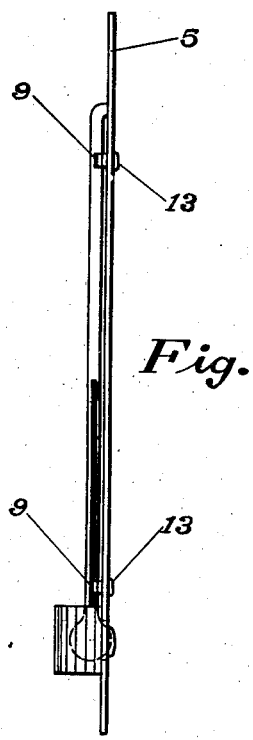
Figure 3:
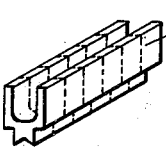
Figure 4:
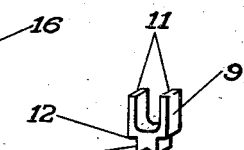
Figure 5:
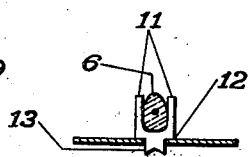
Figure 6:
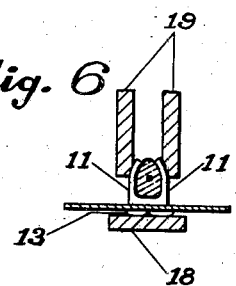
Figure 7:
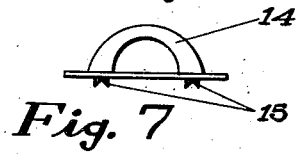
Figure 8:
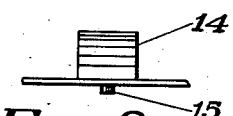
Figure 9:
Figure 10:
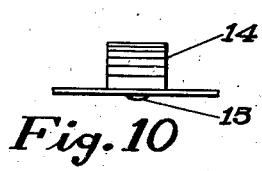

In the drawing, Fig. 1 is a front view of the finished thermometer of the present invention and Fig. 2 is a side elevation thereof; Fig. 3 is a view of an extruded or molded strip of thermoplastic material having the outline of a clasp from which individual clasps can be cut; Fig. 4 shows an individual clasp cut from the strip of Fig. 3; Fig. 5 is a section through a thermometer stem and scale plate with one of the clasps in assembled relation thereon, prior to the operation of forming the clasp to embrace the scale and the stem; Fig. 6 is a sectional view illustrating heated tool parts in operative relation to the assembled thermometer stem, clasp and scale, with portions of the clasp shown formed, under heat, to embrace the several parts; Figs. 7 and 8 are, respectively, a front view and a side view of a thermoplastic bulb guard assembled on the scale plate prior to being anchored thereon; and Figs. 9 and 10 are similar views showing the guard after being attached to the scale plate by upsetting a part of the guard while it is heated.

Referring especially to Figs. 1 and 2, the thermometer comprises a scale plate 5 on the front of which there is mounted a stem 6 of a glass thermometer which terminates in a bulb 7. The bulb and part of the stem are filled with a thermosensitive liquid 8 such as mercury or an organic liquid. The thermometer stem is retained on the scale plate by means of clasps 9 anchored in apertures in the plate at the upper and lower ends of the stem. Each clasp, which is made of thermoplastic material, comprises a pair of forwardly extending fingers 11 adapted to be shaped under heat and pressure to embrace the sides of the thermometer stem. In addition, each clasp is provided with a shoulder 12, to engage the front of the plate and with a preferably notched projection 13 adapted to be inserted through the mentioned aperture in the scale plate, after which parts of this projection are upset to secure the clasp on the scale plate. A bulb guard of thermoplastic material 14, is mounted on the scale plate to extend in front of the bulb 7. The guard is preferably molded from thermoplastic material to have the notched portions 15 adapted to be received in spaced openings adjacent the thermometer bulb and thereafter upset, as shown in Figs. 9 and 10.

In assembling a thermometer according to the present method, each clasp 9 is preferably cut from a strip 16 of thermoplastic material extruded or molded into the general shape illustrated in Fig. 3, it being understood that the strip is cut along the several dotted lines to provide a number of individual clasps 9. Two clasps 9 are used to anchor the stem on the scale plate by inserting the projection 13 of each clasp through an opening in the scale plate, with the shoulder 12 engaging the front of the plate. The thermometer stem is then placed between the fingers 11 of each of the two clasps. The next step in the method comprises applying a heated tool 18 to the rear surface of the scale to heat and upset the notched projection 13, while applying the spaced heated bars 19 having their inner surfaces slightly curved to embrace the fingers 11, thereby heating and shaping these fingers to the shape indicated in Fig. 6. The notched portion 15 on the bulb guard 14 may likewise be heated and thereafter upset in like manner to engage the rear surface of the scale plate.

The present construction is well adapted for rapid production of thermometers without the use of skilled operators. Furthermore, the clasps have no parts which catch on cleaning cloths and yet they securely retain the thermometer stem on the scale. In addition, since the fingers of the clasp do not cross the face of the stem, the indicating liquid column in the stem is not obscured.

I claim:

1. A thermometer comprising a scale plate with spaced openings therein, a thermometer tube including a capillary stem and bulb communicating with said stem, said thermometer tube containing a thermosensitive liquid, and thermoplastic clasps anchoring said thermometer tube to said plate, each clasp having a part engaging the front of the plate adjacent an opening and a projection passing through said opening with the free end of the projection upset and gripping the rear surface of the plate, said clasp also having a pair of spaced fingers at the front of the plate deformed and gripping the sides of said stem.

2. A thermometer comprising a scale plate with spaced openings therein, a thermometer tube including a capillary stem and bulb communicating with said stem, said thermometer tube containing a thermosensitive liquid, and thermoplastic clasps anchoring said thermometer tube to said plate, each clasp having a shoulder engaging the front of the plate adjacent an opening and a projection passing through said opening with the free end of the projection upset and engaging the rear surface of the plate, said clasp also having a pair of spaced fingers extending directly outward from the front of the plate with the outer end portion being bent against the stem and gripping only the sides of the stem but not the front thereof whereby the liquid in the stem is not covered.

H. BRAINARD BROWN.

REFERENCES CITED

The following references are of record in the file of this patent:

UNITED STATES PATENTS

| Number | Name | Date |
| --- | --- | --- |
| 1,612,364 | Ely | Dec. 28, 1926 |
| 2,021,283 | Bolton | Nov. 19, 1935 |
| 2,037,194 | Curtin | Apr. 14, 1936 |
| 802,326 | Sadler | Oct. 17, 1905 |
| 1,377,578 | Harris | May 10, 1921 |
| 1,670,385 | Schawcross | May 22, 1928 |

FOREIGN PATENTS

| Number | Country | Date |
| --- | --- | --- |
| 568,998 | French | Jan. 3, 1924 |